(12) United States Patent
Tokizaki

(10) Patent No.: US 6,775,094 B2
(45) Date of Patent: Aug. 10, 2004

(54) DISK SUPPORTING APPARATUS AND MAGNETIC DISK DRIVE WITH THE SAME

(75) Inventor: Tomoyuki Tokizaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/342,241

(22) Filed: Jan. 15, 2003

(65) Prior Publication Data

US 2003/0161068 A1 Aug. 28, 2003

(30) Foreign Application Priority Data

Feb. 28, 2002 (JP) ........................................ 2002-054561

(51) Int. Cl.$^7$ ............................................. G11B 17/02
(52) U.S. Cl. ................................................. 360/98.08
(58) Field of Search ............................ 360/98.08, 99.12

(56) References Cited

U.S. PATENT DOCUMENTS

| | | | | |
|---|---|---|---|---|
| 5,006,942 A | * | 4/1991 | Brooks et al. ............ | 360/98.08 |
| 6,178,063 B1 | * | 1/2001 | Wood et al. .............. | 360/98.08 |
| 6,226,146 B1 | * | 5/2001 | Landess et al. .......... | 360/98.08 |

FOREIGN PATENT DOCUMENTS

| | | |
|---|---|---|
| JP | 3-91516 | 9/1991 |
| JP | 4-168676 | 6/1992 |
| JP | 5-242580 | 9/1993 |
| JP | 6-215520 | 8/1994 |
| JP | 10-275392 | 10/1998 |
| WO | WO 90/09051 | 8/1990 |

\* cited by examiner

Primary Examiner—Robert S. Tupper
(74) Attorney, Agent, or Firm—Pillsbury Winthrop LLP

(57) ABSTRACT

A plurality of disks and a spacer ring located between the disk are fitted around a hub of a motor and are sandwiched between a disk receiving portion provided at one end of the hub and a clamp member fixed to the other end of the hub. The disk receiving portion and the clamp member have a substantially equal outer diameter. The spacer ring has a larger outer diameter than that the clamp member. The outer peripheral radius rs of the spacer ring, the outer peripheral radius rd of each of the disks, the inner peripheral radius rh of the disk, and the outer peripheral radius rc of the disk receiving portion and clamp member has a relationship:

$$(rc-rh)/rd < 0.1 < (rs-rh)/rd < 0.15.$$

10 Claims, 4 Drawing Sheets

DISK SUPPORTING APPARATUS AND MAGNETIC DISK DRIVE WITH THE SAME

CROSS-REFERENCE TO RELATED APPLICATIONS

This application is based upon and claims the benefit of priority from the prior Japanese Patent Application No. 2002-054561, filed Feb. 28, 2002, the entire contents of which are incorporated herein by reference.

BACKGROUND OF THE INVENTION

1. Field of the Invention

The present invention relates to a disk supporting apparatus, and in particular, to a disk supporting apparatus having magnetic disks, a spacer ring, and the like fixedly stacked together around a hub of a spindle motor, and a magnetic disk drive comprising this disk supporting apparatus.

2. Description of the Related Art

In general, a magnetic disk drive comprises magnetic disks, a spindle motor that rotationally supports and drives the magnetic disks, a carriage assembly supporting magnetic heads, a voice coil motor that drives the carriage assembly, a board unit, and the like, all these components being disposed in a case.

The spindle motor has a cylindrical hub around which a plurality of magnetic disks and a plurality of spacer rings are alternately stacked together. These magnetic disks and spacer rings are mounted at the outer periphery of the hub and sandwiched between a flange formed at one end of the hub and a clamp ring screwed to the other end of the hub.

With such a magnetic disk drive, the speed at which the magnetic disks are rotated must be increased to process data at high speed. Thus, in recent years, high-speed rotating magnetic disk drives have been studied. However, when magnetic disks rotate at high speed, a phenomenon called "flutter" occurs in which the magnetic disks are vibrated owing to a variation in air pressure. If flutter occurs, the magnetic heads are less precisely positioned relative to the corresponding magnetic disks. This prevents recording density from being improved.

To prevent this problem, a high-speed rotating magnetic disk drive has been proposed in which each of the magnetic disks has an outer diameter corresponding to that of a 2.5-inch magnetic disk and an inner diameter corresponding to that of a 3.5-inch magnetic disk so as to reduce the area of each disk which may be vibrated, thus increasing its natural frequency, while reducing the level of flutter.

However, most of the parts of this high-speed rotating magnetic disk drive are different from those commonly used in normal-speed rotating magnetic disk drives. This reduces productivity, while increasing manufacture costs.

BRIEF SUMMARY OF THE INVENTION

An embodiment of the present invention may provide a disk supporting apparatus that reduces the vibration of a disk to allow a head to be more precisely positioned relative to the corresponding disks, while suppressing an increase in manufacture costs.

According to an aspect of the present invention, to attain this object, a disk supporting apparatus comprises a motor including a rotatable hub having a disk receiving portion at an outer periphery of an end of the hub; a plurality of disks each of which has an inner hole through which the hub is inserted, the disks being fitted around an outer periphery of the hub; a spacer ring having an inner hole through which the hub is inserted, the spacer ring being fitted around the outer periphery of the hub and being located between the disks; and a clamp member fixed to other end of the hub to clamp the disks and the spacer ring between the clamp member and the disk receiving portion.

The disk receiving portion and the clamp member have a substantially equal outer diameter. The spacer ring has a larger outer diameter than those of the disk receiving portion and clamp member. If the outer peripheral radius of the spacer ring is defined as rs, the outer peripheral radius of each of the disks is defined as rd, the inner peripheral radius of the disk is defined as rh, and the outer peripheral radius of the disk receiving portion and clamp member is defined as rc, the rs, rd, rh, rc have a relationship:

$$(rc-rh)/rd < 0.1 < (rs-rh)/rd < 0.15.$$

According to another aspect of the present invention, a magnetic disk drive comprises the above described disk supporting apparatus which supports and rotationally drives magnetic disks; magnetic heads configured to record and reproduce information on and from the corresponding magnetic disks; and a carriage assembly which support the magnetic heads so as to be movable relative to the corresponding magnetic disks.

According to the disk supporting apparatus and magnetic disk drive configured as described above, when the outer peripheral radius of the spacer ring is defined as rs, the outer peripheral radius of each of the disks is defined as rd, the inner peripheral radius of the disk is defined as rh, and the outer peripheral radius of the disk receiving portion and clamp member is defined as rc, the above relationship is established. This enables the radius of a fixed portion of the disk and the natural frequency of the disk to be increased without changing the hub and the clamp member. Consequently, even if the disk is rotated at high speed, its vibration can be reduced to allow the corresponding head to be precisely positioned relative to the disk.

Additional embodiments and advantages of the invention will be set forth in the description which follows, and in part will be obvious from the description, or may be learned by practice of the invention. The embodiments and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

With reference to the drawings, a detailed description will be given below of hard disk drives (hereinafter referred to as "HDDs") as magnetic disk drives according to embodiments of the present invention.

Figure 1:
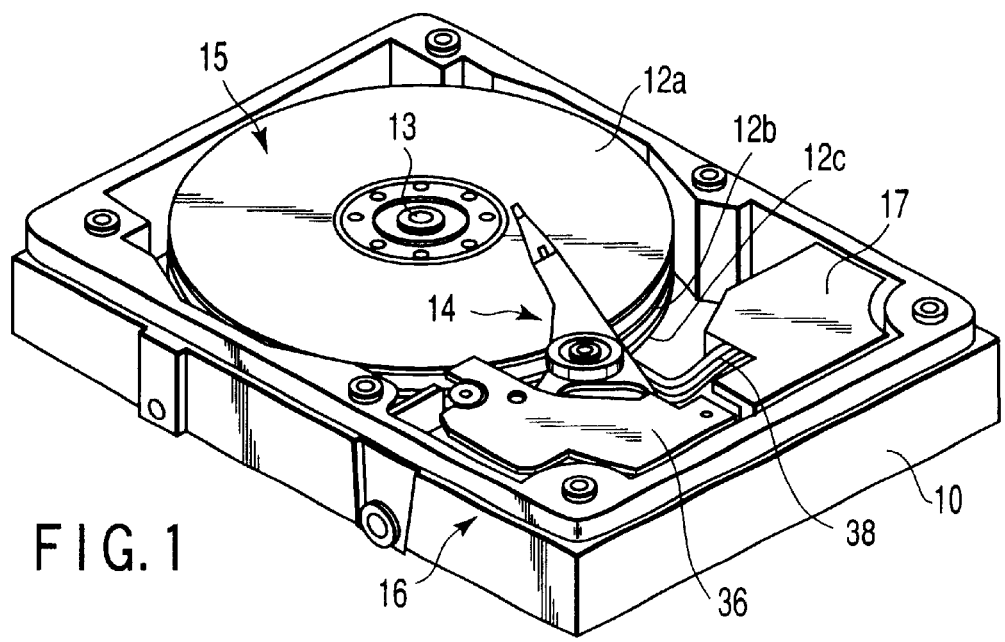
FIG. 1 is a perspective view showing the interior of a hard disk drive according to an embodiment of the present invention.

As shown in FIG. 1, an HDD has a case 10 shaped like a rectangular box having an opened top, and a top cover (not shown) fixed to the case using a plurality of screws to close the opened top of the case.

A disk supporting apparatus 15 is disposed in the case 10, and comprises three magnetic disks 12a, 12b, and 12c and a spindle motor 13 that supports and rotationally drives these magnetic disks. Further, the case 10 houses a plurality of magnetic heads that record and reproduce information on and from the magnetic disks 12a, 12b, and 12c, a carriage assembly 14 that supports these magnetic heads to be movable relative to the magnetic disks 12a, 12b, and 12c, a voice coil motor (hereinafter referred to as a "VCM") 16 that rotationally moves and positions the carriage assembly, and a board unit 17 having a preamplifier and the like.

A printed circuit board (not shown) is screwed to an outer surface of a bottom wall of the case 10 and controls operations of the spindle motor 13, the VCM 16, and the magnetic heads via the board unit 17.

Figure 2:
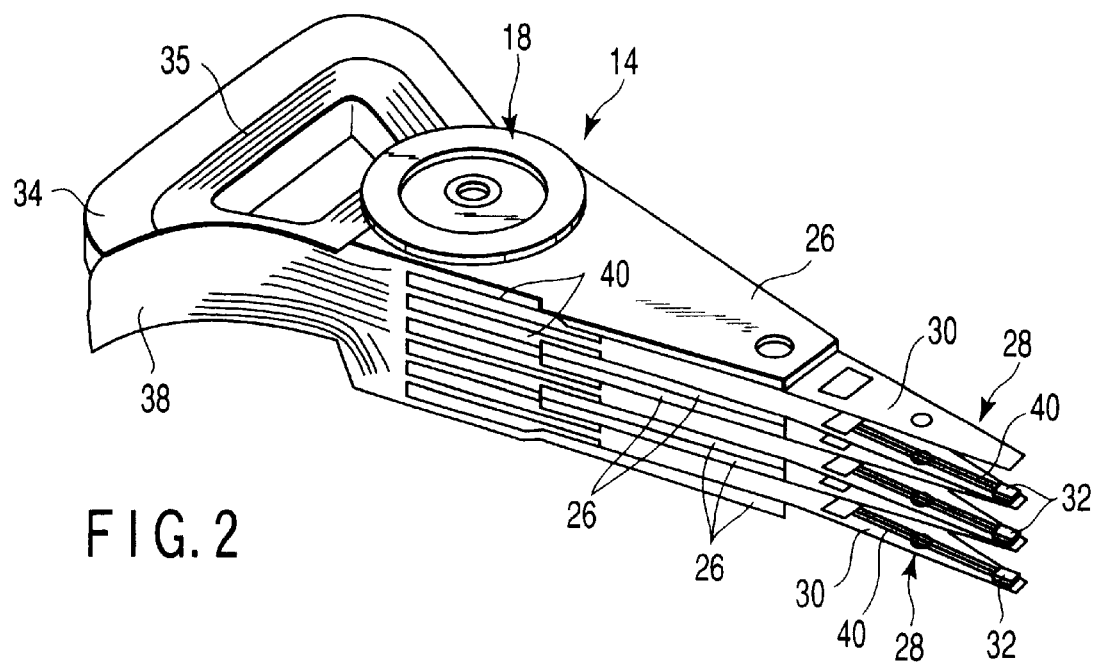
FIG. 2 is a perspective view of a carriage assembly provided in the hard disk drive.

As shown in FIGS. 1 and 2, the carriage assembly 14 includes a bearing portion 18 fixed to the bottom wall of the case 10. Six arms 26 are fixed to the bearing portion 18 and extend parallel with one another in the same direction. Each of the arms 26 is formed of a stainless steel-based material such as SUS304 so as to be a thin plate of about 250 μm thickness.

A magnetic head assembly 28 is attached to the extended end of each arm 26. The magnetic head assembly 28 includes an elongate suspension 30 and a magnetic head 32 fixed to the suspension. The suspension 30 is formed of a plate spring of 60 to 70 μm thickness and has its proximal end fixed to the extended end of the arm 26 by spot welding or adhesion so as to extend from the arm. The suspension 30 may be formed of the same material as that of the arm and integrally with the arm.

Each magnetic head 32 has a generally rectangular slider (not shown) and an MR (magnetic resistance) head formed on the slider to carry out recording and reproduction. The magnetic head 32 is fixed to a gimbal portion formed at the extended end of the suspension 30. The six magnetic heads 32 attached to the respective arms 32 so that each pair of magnetic heads 32 are located opposite each other with interposing the corresponding magnetic disk between the pair.

Further, the carriage assembly 14 has a support frame 34 extending from the bearing portion 18 in a direction opposite to that in which the arms 26 extend. A voice coil 35 is fixed to the support frame 34 and constitutes a part of the VCM 16.

As shown in FIG. 1, when the carriage assembly 14 is incorporated into the case 10, the voice coil 35 is located between a air of yokes 36 (only one of them is shown) fixed to the case 10. The voice coil 35 constitutes the VCM 16 together with these yokes 36 and a magnet (not shown) fixed to one of the yokes. When electricity is conducted through the voice coil 35, the carriage assembly 14 is rotationally moved to position the magnetic heads 32 on desired tracks of the corresponding magnetic disks 12a, 12b, or 12c.

As shown in FIGS. 1 and 2, one end of a main flexible printed circuit board (hereinafter referred to as a "main FPC") is attached to a peripheral surface of the bearing portion 18 of the carriage assembly 14. The other end of the main FPC 38 is connected to the board unit 17. Each magnetic head 32 is electrically connected to the main FPC 38 via a relay flexible printed circuit board 40 extending over the corresponding arm 26 and suspension 30. Thus, each magnetic head 32 is electrically connected to the board unit 17 through the corresponding relay flexible printed circuit board 40 and the main FPC 38.

Figure 3:
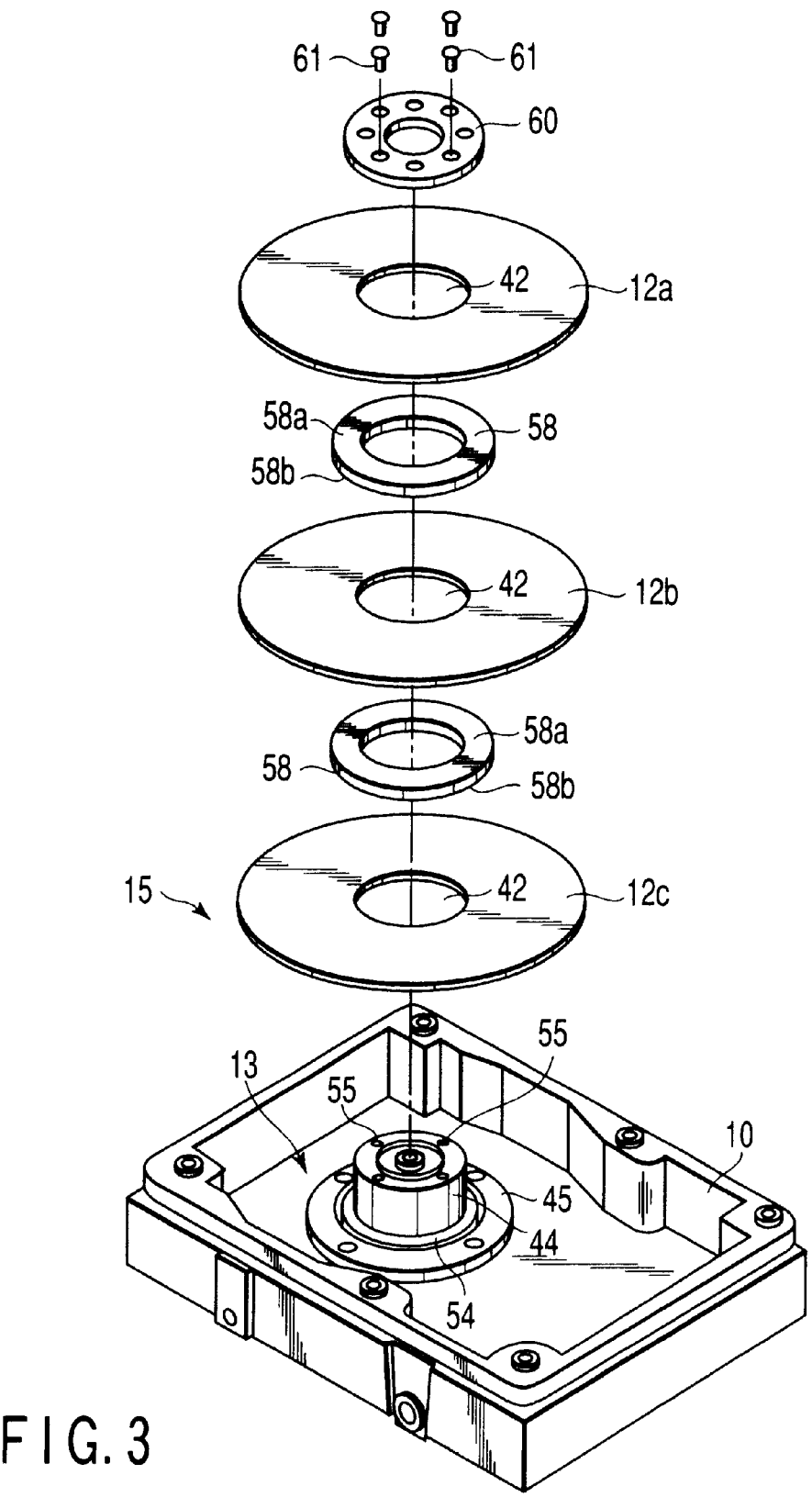
FIG. 3 is an exploded perspective view showing a case of the hard disk drive, a spindle motor, and magnetic disks.

As shown in FIGS. 1 and 3, in the disk supporting apparatus 15, the magnetic disks 12a, 12b, and 12c are each formed to have a diameter of 65 mm (2.5 inches) and each have an inner hole 42 in their central portion, and magnetic recording layers on their top and bottom surfaces. The spindle motor 13 is of an outer rotor type and has a cylindrical hub 44 functioning as a rotor. The three magnetic disks 12a, 12b, and 12c are coaxially fitted around the hub 44 and are stacked together in the axial direction of the hub at predetermined intervals. The magnetic disks 12a, 12b, and 12c are rotated at a predetermined speed by the spindle motor 13.

Figure 4:
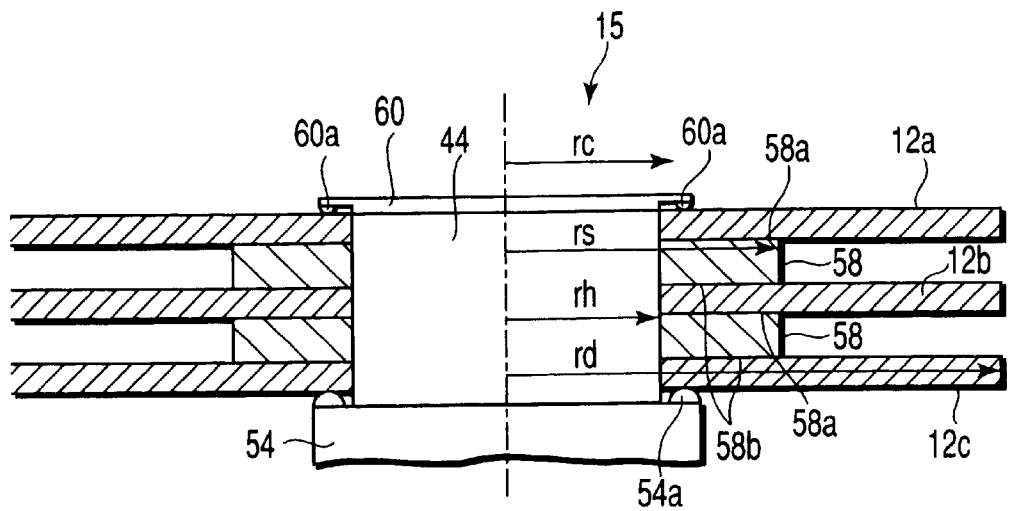
FIG. 4 is a sectional view showing a disk supporting apparatus for the hard disk drive.

More specifically, as shown in FIGS. 3 and 4, a flange 54 is formed at the outer periphery of the lower end of the hub 44 to function as a disk receiving portion. The hub 44 has a plurality of tapped holes 55 formed in its upper end surface to screw down a clamp ring described later. The spindle motor 13 is fixed to a predetermined position in the case 10 by screwing a motor bracket 45 to the bottom wall of the case 10.

The three magnetic disks 12a, 12b, and 12c are fitted around the outer peripheral surface of the hub 44 with the hub 44 being inserted through their inner holes 42, and are stacked together on a flange 54 in the axial direction of the hub 44. Annular abutting portion 54a is formed at an outer peripheral portion of the top surface of the flange 54 and projects upward from the flange 54. The annular abutting portion 54a abuts against the bottom magnetic disk 12c. Further, a pair of spacer rings 58 are fitted around the outer periphery of the hub 44 and are stacked together so as to be sandwiched between the magnetic disks 12a and 12b and between the magnetic disks 12b and 12c, respectively. Each of the spacer rings 58 has annular first and second surfaces 58a and 58b abutting against the corresponding magnetic disks.

A clamp ring 60 serving as clamp member is fixed to the upper end surface of the hub 44 by means of four screws 61. An annular abutting portion 60a is formed on the inner surface of the outer peripheral portion of the clamp ring 60 and projects downward. The abutting portion 60a abuts against the top surface of central portion of the top magnetic disk 12a to press the three magnetic disks 12a, 12b, and 12c and the two spacer rings 58 toward the flange 54. This causes the magnetic disks 12a, 12b, and 12c and the spacer ring 58 to be sandwiched between the flange 54 and the clamp ring 60 and be fixedly held on the hub 44 so as to be tightly contacted with one another.

As shown in FIG. 4, in the HDD according to this embodiment, the outer peripheral radius rc of the clamp ring 60 is formed to be substantially the same as that of the flange 54. Here, the outer peripheral radius rc of the clamp ring 60 indicates the radius of the abutting portion 60a, which abuts against the corresponding magnetic disk. Further, the outer peripheral radius of the flange 54 indicates the radius of the abutting portion 54a, which abuts against the corresponding magnetic disk. In contrast, the outer peripheral radius rs of each spacer ring 58 is formed to be larger than the radius rc of the abutting portions 60a and 54a. Accordingly, the spacer ring 58 projects outward from the abutting portions 60a and 54a.

If the outer peripheral radius of each magnetic disk is defined as rd and the inner peripheral radius of the magnetic disk is defined as rh, the clamp ring 60, the magnetic disks, and the spacer ring 58 have the following relationship:

$$(rc-rh)/rd<0.1<(rs-rh)/rd<0.15.$$

According to the HDD configured as described above, when the outer peripheral radius of the spacer ring 58, the outer peripheral radius of each magnetic disk, and the abutting portions 60a and 54a have the above relationship, the radius of the fixed portion of the magnetic disk can be increased to increase the natural frequency of the magnetic disk. Accordingly, even if the magnetic disk is rotated at high speed, its vibration can be reduced to allow the corresponding magnetic head to be more precisely positioned relative to the magnetic disk.

Figure 5:
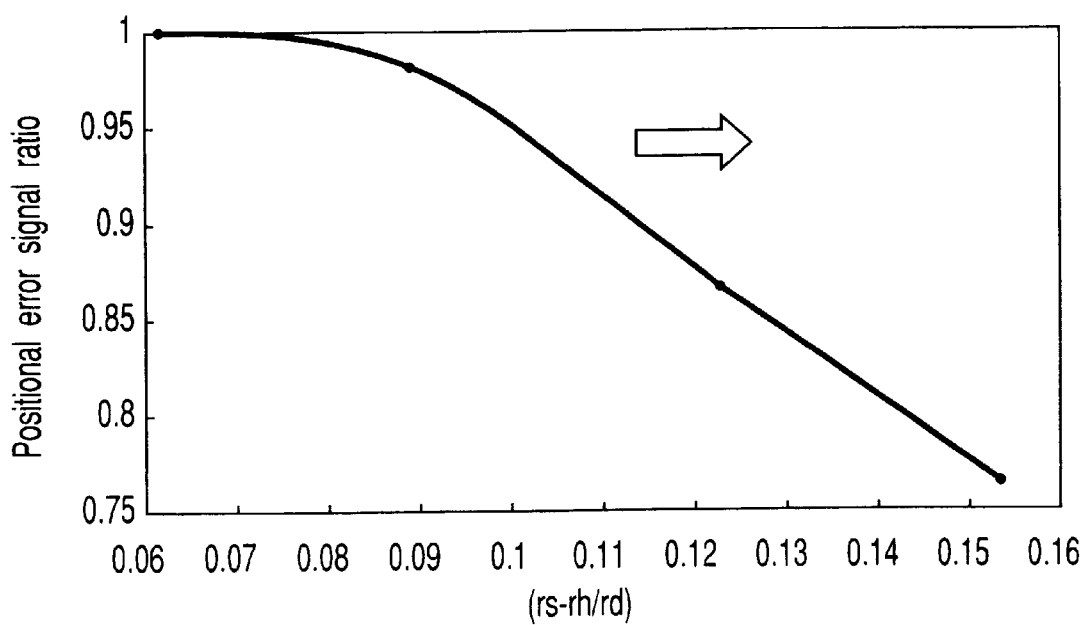
FIG. 5 is a graph showing the relationship between (rs−rh)/rd and a positional error signal ratio for the hard disk drive.

The inventor tested the relationship between $(rs-rh)/rd$ and an error signal ratio for the position of the magnetic head with respect to the magnetic disk by varying the value rs while keeping the values rd and rh constant. FIG. 5 shows the results of the tests. As seen from this figure, if the value $(rs-rh)/rd$ is at 0.1 or more, the error signal ratio for the position decreases and the magnetic heads can be positioned relative to the magnetic disk with high accuracy. If the value $(rs-rh)/rd$ is excessively large, the recording capacity of the magnetic disk decreases. Thus, the value $(rs-rh)/rd$ is desirably set at 0.15 or less in view of its relationship with the storage capacity of the magnetic disk.

Further, according to the above described HDD, the above relationship is obtained by changing only the outer diameter of the spacer ring 58 without changing the outer diameter of each magnetic disk, the outer diameter of the hub 44, the outer diameter of the clamp ring 60, or the like. Consequently, the vibration of the magnetic disks can be reduced by changing a minimum number of parts. Therefore, an HDD with a high recording and reproducing precision is obtained without increasing manufacture costs or reducing productivity.

Figure 6:
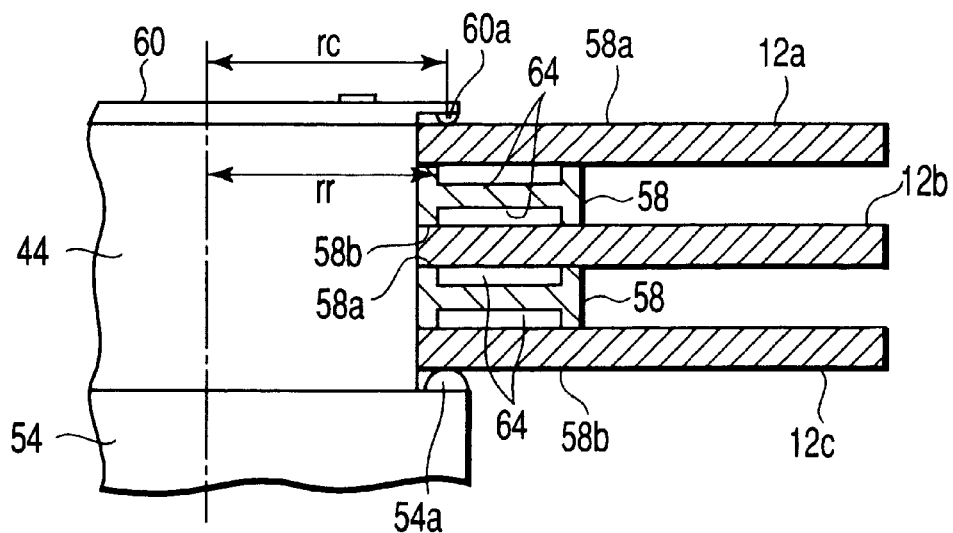
FIG. 6 is a sectional view schematically showing a disk supporting apparatus for a hard disk drive according to a second embodiment of the present invention.

Now, an HDD according to a second embodiment of the present invention will be described. As shown in FIG. 6, according to this HDD, spacer rings 58 of the disk supporting apparatus 15 each have first and second surfaces 58a and 58b, which abut against corresponding magnetic disks 12a, 12b, and 12c. An annular concave portion 64 coaxial with the corresponding spacer ring is formed in each of the first and second surfaces 58a and 58b. The inner peripheral radius rr of each annular concave portion 64 is smaller than the outer peripheral radius rc of the clamp ring 60.

By thus forming the annular concave portion 64 in each of the contact surfaces of the spacer ring 58, the magnetic disks is reliably fixed to the outer circumferential end portion of the first and second surfaces of the corresponding spacer ring, thus further increasing the natural frequency of the magnetic disks. This reduces the vibrational displacement of the magnetic disks to allow the corresponding magnetic heads to be more precisely positioned relative to the disks. In this embodiment, the concave portion 64 is formed in each of the first and second surfaces 58a and 58b of the spacer ring 58. However, the natural frequency of the magnetic disks can be increased by forming the concave portion in at least one of the surfaces.

Figure 7:
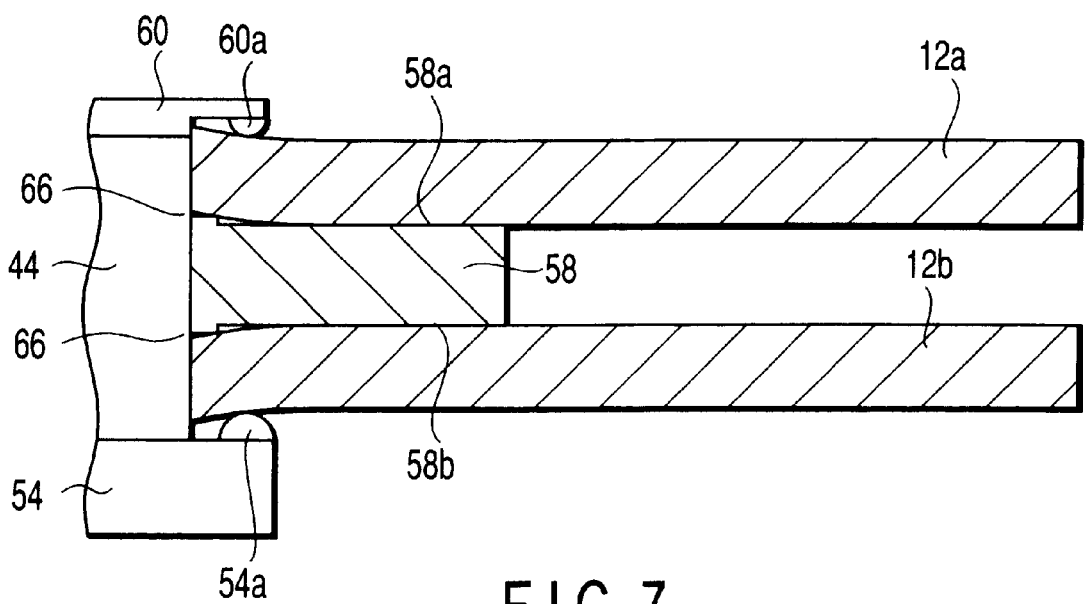
FIG. 7 is a sectional view schematically showing a disk supporting apparatus for a hard disk drive according to a third embodiment of the present invention.

Further, in an HDD according to a third embodiment shown in FIG. 7, a spacer ring 58 of the disk supporting apparatus 15 has the first and second surfaces 58a and 58b abutting against magnetic disks 12a and 12b, respectively. An annular convex portion 66 is formed in an inner peripheral portion of each of the first and second surfaces 58a and 58b and coaxially with the spacer ring. In this embodiment, the two magnetic disks 12a and 12b and the one spacer ring 58 sandwiched between these magnetic disks are attached to the hub 44.

By thus forming the annular convex portion 66 on the inner circumferential portion of the spacer ring 58 to make the inner peripheral portion thicker than an outer peripheral portion of the spacer ring 58, the inner peripheral edges of the magnetic disks 12a and 12b are slightly bent and deformed in a direction in which the disks are separated from the spacer ring. This enables the magnetic disks 12a and 12b to be fixed to the outer circumferential end portion of the first and second surfaces 58a and 58b of the spacer ring 58. This further increases the natural frequency of the magnetic disks to reduce their vibrational displacement, thus allowing the corresponding magnetic heads to be more precisely positioned relative to the magnetic disks. In this embodiment, the convex portion 66 is formed on each of the first and second surfaces 58a and 58b of the spacer ring 58. However, the natural frequency of the magnetic disks can be increased by forming the convex portion 66 on at least one of the surfaces.

In the second and third embodiments, the other parts of the configuration are the same as those of the first embodiment. The same parts are denoted by the same reference numerals, and their detailed description is omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, in the description of the first and second embodiments, the apparatus comprises the three magnetic disks. However, the number of magnetic disks can be increased or reduced as required. Further, a spacer ring configured as described above may be arranged between the disk receiving portion 54 of the hub 44 and the bottom magnetic disk. Furthermore, a spacer ring configured as described above may be arranged between the clamp ring 60 and the top magnetic disk. Moreover, the disk supporting apparatus according to the present invention is not limited to the magnetic disk drive. The present invention may be applied to other disk drive apparatus such as an optical disk drive of a phase-change type or a magneto-optical disk drive.

What is claimed is:

1. A disk supporting apparatus comprising:
   a motor including a rotatable hub having a disk receiving portion at an outer periphery of an end of the hub;
   a plurality of disks each of which has an inner hole through which the hub is inserted, the disks being fitted around an outer periphery of the hub;

a spacer ring having an inner hole through which the hub is inserted, the spacer ring being fitted around the outer periphery of the hub and being located between the disks; and a clamp member fixed to other end of the hub to clamp the disks and the spacer ring between the clamp member and the disk receiving portion;

the disk receiving portion and the clamp member having a substantially equal outer diameter, the spacer ring having a larger outer diameter than those of the disk receiving portion and clamp member, and if the outer peripheral radius of the spacer ring is defined as rs, the outer peripheral radius of each of the disks is defined as rd, the inner peripheral radius of the disk is defined as rh, and the outer peripheral radius of the disk receiving portion and clamp member is defined as rc, the rs, rd, rh, rc having a relationship:

$$(rc-rh)/rd<0.1<(rs-rh)/rd<0.15.$$

2. A disk supporting apparatus according to claim 1, wherein the spacer ring has annular first and second surfaces abutting against the corresponding disks and an annular concave portion formed in at least one of the first and second surfaces and coaxially with the spacer ring.

3. A disk supporting apparatus according to claim 2, wherein the inner peripheral radius of the concave portion is smaller than the outer peripheral radius of the clamp member.

4. A disk supporting apparatus according to claim 1, wherein the spacer ring has annular first and second surfaces abutting against the corresponding disks and an annular concave portion formed in each of the first and second surfaces and coaxially with the spacer ring.

5. A disk supporting apparatus according to claim 4, wherein the inner peripheral radius of each of the concave portions is smaller than the outer peripheral radius of the clamp member.

6. A disk supporting apparatus according to claim 1, wherein the spacer ring has an annular first and second surfaces abutting against the corresponding disks and an annular convex portion formed in an inner peripheral portion of at least one of the first and second surfaces and coaxially with the spacer ring, and the outer peripheral radius of the convex portion is smaller than that of the clamp member.

7. A magnetic disk drive comprising:

a disk supporting apparatus supporting magnetic disks and configured to rotate the magnetic disks;

magnetic heads configured to record and reproduce information on and from the corresponding magnetic disks; and a carriage assembly supporting the magnetic heads to be movable relative to the corresponding magnetic disks;

the disk supporting apparatus comprising:

a motor including a rotatable hub having a disk receiving portion at an outer periphery of an end of the hub, each of the magnetic disks having an inner hole through which the hub is inserted, and being fitted around an outer periphery of the hub;

a spacer ring having an inner hole through which the hub is inserted, the spacer ring being fitted around the outer periphery of the hub and being located between the magnetic disks; and a clamp member fixed to other end of the hub to clamp the magnetic disks and the spacer ring between the clamp member and the disk receiving portion;

the disk receiving portion and the clamp member having a substantially equal outer diameter, the spacer ring having a larger outer diameter than those of the disk receiving portion and clamp member, and if the outer peripheral radius of the spacer ring is defined as rs, the outer peripheral radius of each of the disks is defined as rd, the inner peripheral radius of the disk is defined as rh, and the outer peripheral radius of the disk receiving portion and clamp member is defined as rc, the rs, rd, rh, rc having a relationship:

$$(rc-rh)/rd<0.1<(rs-rh)/rd<0.15.$$

8. A magnetic disk drive according to claim 7, wherein the spacer ring has annular first and second surfaces abutting against the corresponding magnetic disks and an annular concave portion formed in each of the first and second surfaces and coaxially with the spacer ring.

9. A magnetic disk drive according to claim 8, wherein the inner peripheral radius of each of the concave portions is smaller than the outer peripheral radius of the clamp member.

10. A magnetic disk drive according to claim 7, wherein the spacer ring has an annular first and second surfaces abutting against the corresponding disks and an annular convex portion formed in an inner peripheral portion of at least one of the first and second surfaces and coaxially with the spacer ring, and the outer peripheral radius of the convex portion is smaller than that of the clamp member.

* * * * *